United States Patent
Holland et al.

(10) Patent No.: US 9,105,112 B2
(45) Date of Patent: Aug. 11, 2015

(54) POWER MANAGEMENT FOR IMAGE SCALING CIRCUITRY

(71) Applicant: Apple Inc., Cupertino, CA (US)

(72) Inventors: Peter Holland, Los Gatos, CA (US); Hao Chen, San Ramon, CA (US); Albert Kuo, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 211 days.

(21) Appl. No.: 13/773,522

(22) Filed: Feb. 21, 2013

(65) Prior Publication Data

US 2014/0232731 A1 Aug. 21, 2014

(51) Int. Cl.
- G06T 3/40 (2006.01)
- G06T 1/60 (2006.01)
- G06F 1/32 (2006.01)

(52) U.S. Cl.
CPC .............. *G06T 1/60* (2013.01); *G06F 1/3228* (2013.01); *G06F 1/3265* (2013.01); *G06F 1/3287* (2013.01); *G06T 3/4007* (2013.01); *G09G 2330/021* (2013.01); *G09G 2340/0407* (2013.01); *Y02B 60/1242* (2013.01); *Y02B 60/1282* (2013.01); *Y02B 60/32* (2013.01)

(58) Field of Classification Search
None
See application file for complete search history.

(56) References Cited

U.S. PATENT DOCUMENTS

| 5,469,223 | A | * | 11/1995 | Kimura | 348/581 |
| 5,886,689 | A | * | 3/1999 | Chee et al. | 345/212 |
| 6,894,706 | B1 | * | 5/2005 | Ward et al. | 345/660 |
| 7,418,606 | B2 |  | 8/2008 | Holmer |  |
| 7,802,118 | B1 | * | 9/2010 | Abdalla et al. | 713/322 |
| 2003/0081858 | A1 | * | 5/2003 | Rathnam et al. | 382/298 |
| 2008/0084491 | A1 |  | 4/2008 | He et al. |  |
| 2012/0038822 | A1 | * | 2/2012 | Hsu et al. | 348/458 |

OTHER PUBLICATIONS

NVidia, "Whitepaper NVIDIA Tegra 4 Family GPU Architecture Table of Contents", Feb. 15, 2013, XP055113921, http://www.nvidia.cn/content/PDF/tegra_white_papers/Tegra_4_GPU_Whitepaper_FINALv2.pdf.*
Shivajit Mohapatra, Nikil Dutt, Alex Nicolau, and Nalini Venkatasubramanian, "DYNAMO: A Cross-Layer Framework for End-to-End QoS and Energy Optimization in Mobile Handheld Devices," IEEE Journal on Selected Areas in Communications, vol. 25, No. 4, May 2007, pp. 722-737.
International Search Report and Written Opinion in PCT Application No. PCT/US2014/015979 mailed May 22, 2014, 15 pages.
Whitepaper NVIDIA Tegra 4 Family, GPU Architecture, V1.0, XP055113921, Feb. 2013, 26 pages.

* cited by examiner

*Primary Examiner* — Jason M Repko
*Assistant Examiner* — Diane Wills
(74) *Attorney, Agent, or Firm* — Meyertons, Hood, Kivlin, Kowert & Goetzel, P.C.

(57) ABSTRACT

Techniques are disclosed relating to power management within an integrated circuit. In one embodiment, a display buffer receives image data through a data transfer interconnect. A data transfer interconnect is powered down based on the received image data being greater than a threshold amount of data. The display buffer transmits at least a portion of the image data to one or more outputs, and in response to the transmitting, the data transfer interconnect is powered up. In some embodiments, the display buffer includes a plurality of line buffers, each configured to store a respective image source line. In such an embodiment, a display pipe configured to render images to be displayed includes the display buffer, and the powering down is performed in response to the received image data including two or more image source lines.

20 Claims, 6 Drawing Sheets

POWER MANAGEMENT FOR IMAGE SCALING CIRCUITRY

BACKGROUND

1. Technical Field

This disclosure relates to display pipelines, and, more specifically to power management associated with display pipelines.

2. Description of the Related Art

As the power and complexity of computer systems increase, graphics operations are increasingly being performed using dedicated graphics rendering hardware. Accordingly, a graphics processing unit (GPU) may include various built-in and configurable structures within a display pipe for rendering images of pixel data to be presented via a display. These structures may implement various pipeline stages corresponding to, for example, rasterisation, overlaying, blending, clipping, dithering, color space conversion, frame rotation, frame buffering, etc.

In some instances, a display pipeline may also include dedicated structures for scaling images, such as, to a native resolution of an output device. The structures may implement scaling operations that perform linear transformations to upscale or downscale image data. Such scaling may include horizontal and/or vertical scaling.

SUMMARY

The present disclosure describes embodiments in which power management is performed based on the operation of a display buffer. In one embodiment, the display buffer stores image source lines (e.g., horizontal or vertical image lines) fetched from memory for a display pipeline that uses the source lines to render images for a display. In various embodiments, the image source lines may be fetched as individual lines or as blocks of multiple lines, based on operations being performed by the display pipe. For example, in one embodiment, the display pipe may fetch individual lines more frequently if it is scaling, and it may fetch blocks less frequently if it is not scaling.

In various embodiments, one or more circuits may be power managed depending on whether multiple or individual image source lines are being fetched for the display buffer. In some embodiments, these circuits may include a data transfer interconnect transmitting the image source lines from memory to the display buffer, a memory controller of the memory storing the image source lines, etc. Accordingly, in one embodiment, if blocks of image source lines are being fetched, these circuits may be powered down (i.e., their power may be reduced) when they are idle between the fetching of source lines. They may then be powered up once a request to fetch additional source lines is received. In many instances, power managing circuits in this manner can achieve power savings without sufficiently compromising performance.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components in this disclosure may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

DETAILED DESCRIPTION

Figure 1:
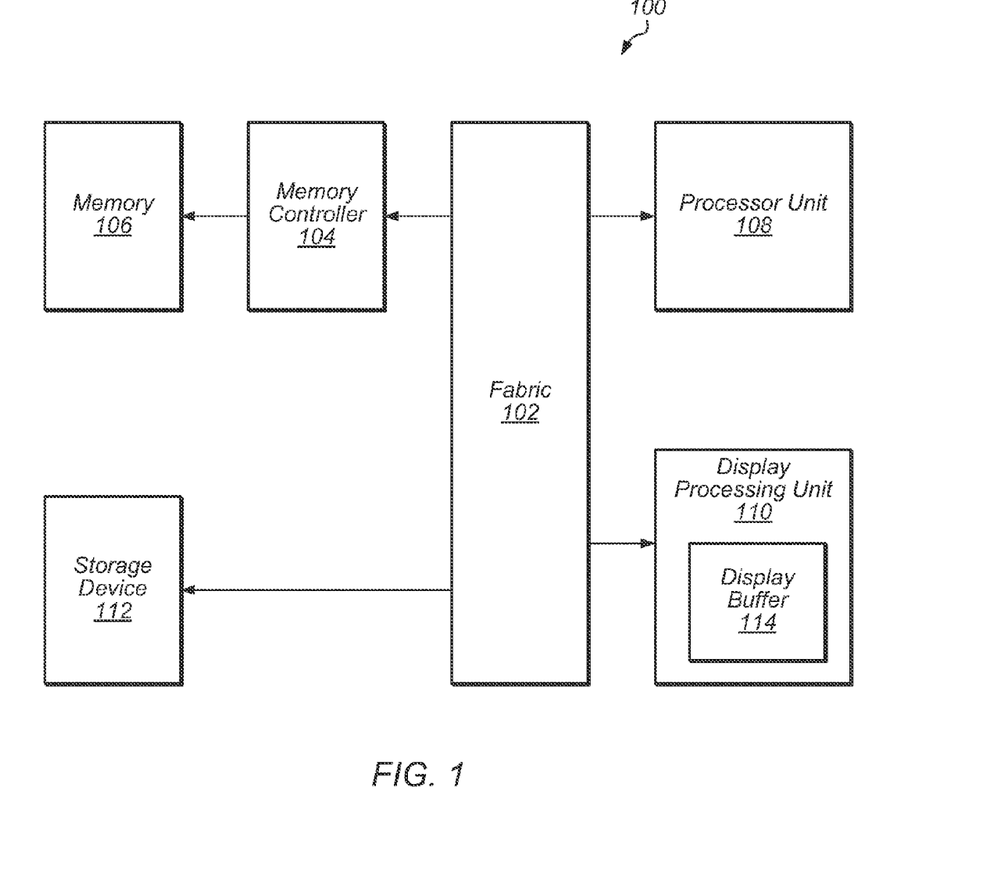
FIG. 1 is a block diagram illustrating one embodiment of a computer system.

Turning now to FIG. 1, a block diagram of one embodiment of a system 100 is shown. As illustrated, system 100 includes various components such as a processor unit 108, memory 106, solid state device 112, display unit 110 and fabric 102. System 100 may correspond to any suitable computer system. Accordingly, in some embodiments, system 100 may be a mobile device (e.g., a mobile phone, a tablet, personal data assistant (PDA), etc.), desktop computer system, server system, network device (e.g., router, gateway, etc.), microcontroller, etc. In one embodiment, multiple components of system 100 may be included together within a system on a chip (i.e., an integrated circuit which integrates components of a computer into a single integrated circuit).

In certain embodiments, system 100 is configured to render video and images on a screen coupled to system 100. Accordingly, in various embodiments, system 100 comprises specialized circuitry dedicated to processing and manipulating graphics data prior to rendering a display.

Additionally, system 100 is configured to be power-managed. Accordingly, in various embodiments, system 100 may disable power and/or cause one or more circuits or the fabric (i.e., fabric 102) to enter a power-managed state. As used here, the terms "power-manage," "power down," "put to sleep," and the like refer to reducing a circuit's power consumption. This reduction may be achieved, for example, through clock gating (i.e., disabling a circuit's reception of a clock signal), power gating (i.e., disabling a circuit's voltage supply), etc. In certain cases, power gating a circuit may result in greater power savings than if the circuit were clock-gated. Powering down a circuit or standardized bus may result in the functionality of the circuit being disabled.

In some embodiments, a power-managed state may be applicable to multiple ones of components 102-114 or system 100 as a whole. For example, in one embodiment in which system 100 is a mobile phone or tablet, system 100 is configured to enter a power-managed state when the mobile phone or tablet is idle (e.g., in a user's pocket or when the user has stepped away from the tablet). While system 100 is in a low-power state, it may clock gate or power gate fabric 102, memory controller 104 and memory 106 as is further discussed below. Power management for system 100 may be desired for many reasons. In some embodiments, power management of system 100 may reduce overall energy consumption, prolong battery life, reduce cooling requirements, and reduce operating costs for energy and cooling.

As illustrated, components of system 100 are coupled via fabric 102. The term "fabric" (or "data transfer interconnect") refers generally to a set of physical connections that are shared among two or more structures (e.g. display processing unit 110 and memory 106). These physical connections provide pathways for transferring information within devices, components or units that may be present on system 100. Accordingly, in some embodiments, fabric 102 may include one or more buses, controllers, interconnects, and/or bridges. In some embodiments, fabric 102 may implement a single communication protocol and elements coupled to fabric 102 may convert from the single communication protocol to other communication protocols internally. For example, in one embodiment, fabric 102 includes a Northbridge and a Southbridge. As discussed further below, in various embodiments, fabric 102 may be configured to power down if left idle and power back up upon receiving a communication.

In various embodiments, processor unit 108 may execute program instructions (e.g., drivers) that control the operation of display processing unit 110, memory controller 104, memory 106 and storage device 112. In such an embodiment, processor unit 108 may also execute program instructions (e.g., applications) that may provide data to be communicated to one or more components within system 100. Processor unit 108 may implement any instruction set architecture, and may be configured to execute instructions defined in that instruction set architecture. Processor unit 108 may employ any microarchitecture, including scalar, superscalar, pipelines, superpipelined, out of order, in order, speculative, non-speculative, etc., or combinations thereof. Processor unit 108 may include circuitry, and optionally may implement microcoding techniques. Furthermore, processor unit 108 may include one or more cache levels. In some embodiment, processor unit 108 may be a plurality of processors.

In one embodiment, memory 106 stores image data that may be used to render an image display. Image data may comprise bits of data that specify an image value for each specific pixel on a display unit. Image data may include raster graphics which may also be referred to herein as bitmaps. Raster graphics data may be stored and manipulated as a grid of individual pixels viewable through a display medium. A bitmap may be characterized by its width and height in pixels. Commonly a color bitmap may be defined in RGB (i.e., red, green, blue) color space and it may further comprise an alpha channel used to store additional data such as per-pixel transparency values. In other embodiments, the image data may be defined using other color spaces such as sRGB, Adobe RGB (ARGB), cyan magenta yellow key (CMYK), $YC_BC_R$, CIE 1931 XYZ, etc. In some embodiments, image data may include subsampled chroma. For example, in the case of $YC_BC_R$ 4:2:2 color space, two horizontally adjacent pixels may include their own respective Y components related to the luminance (i.e., light intensity) and share $C_B$ and $C_R$ chroma components. Memory 106 may store various types of image data such as videos, pictures, and other types of graphics images that may be displayed on a display unit.

The image data may be rendered to a display unit such as a computer monitor, television or phone monitor. Any imaging device that is configured to display digital image data may be used. An image device may be configured to display data read by display processing unit 110, discussed further below.

Memory 106 may be any type of memory, such as dynamic random access memory (DRAM), synchronous DRAM (SDRAM), double data rate (DDR, DDR2, DDR3, etc.). SRAM (including mobile versions of the SDRAMS such as mDDR2, etc., and/or low-power versions of the SDRAMS such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. In some embodiments, memory 106 may be mounted with an integrated circuit in a chip-on-chip configuration, a package-on-package configuration, or a multi-chip module configuration.

In various embodiments, memory 106 may be controlled by memory controller 104. Accordingly, memory controller 104 may facilitate the performance of read and write operations responsive to data requests received via fabric 102 from units 108 and 110. Memory controller 104 may perform various memory physical interface (PHY) functions such as memory refreshing, memory row-address and column-address strobe operations, etc. As discussed below, memory controller 104 may also be used to power-manage memory 106. The image data may be accessed via fabric 102 and transferred to display processing unit 110 as discussed further below.

In various embodiments, storage device 112 may store program instructions (e.g., applications) executable by processor unit 108. In certain embodiments, storage device 112 may store a plurality of image data that may be transferred to memory 106 (i.e., so that future requests for that data can be served faster) or transferred to display processing unit 110 directly. Storage device 112 may be any suitable type of non-volatile memory hard disk drive (e.g., Small Computer System Interface (SCSI) drives, Serial AT Attachment (SATA) drives, etc.), tape drives, optical drives (e.g., CD drives, DVD drives, Blu-Ray drives, etc.), etc. Storage device 112 may also be a solid-state device (SSD) such as one including NAND flash memory, NOR flash memory, nano RAM ("NRAM"), etc.

In various embodiments, display processing unit 110 is configured to process image data such that system 100 can render the data on a display unit. Display processing unit 110 may include a display pipe that includes various pipeline stages such as rasterisation, overlaying, blending, clipping, dithering, color space conversion, frame rotation, and frame buffering. Display processing unit 110 also includes one or more display buffers 114 to buffer image data used by one or more of these stages. In various embodiments, data may be buffered as image source lines. As used herein, an "image source line" refers to image data corresponding to either a vertical or horizontal line of an image (i.e., data corresponding to a horizontal or vertical line of pixels). For the sake of this disclosure, this term may refer to an entire line (e.g., a horizontal line spanning the entire width of an image) or a portion of line (e.g., nine pixels within a horizontal line). Accordingly, in various embodiments, the source lines stored in display buffer 114 may correspond to a partial line in an image as opposed to a full line.

In various embodiments, the display processing unit 110 fetches image data to store in buffer 114 by sending requests for image data via fabric 102 to memory 106. In certain embodiments, circuitry within system 100 may be power-managed based on the fetching of image data by display processing unit 110. In one embodiment, this circuitry includes fabric 102. Accordingly, fabric 102 may be power managed by reducing power to one or more bus controllers, control lines, data lines, and/or clock signal lines. In some embodiments, power may be reduced to the entirety of fabric 102; in other embodiments, power may reduced to merely a portion—e.g., the interconnecting controllers and lines between display processing unit 110 and memory controller 104. In one embodiment, memory controller 104 may also be power managed—e.g., unit 104 may be clock gated and/or power gated.

In some embodiments, units 110 and 104 may be power managed based on the fetching of image data. In one embodiment, the rate at which data is fetched is a factor in determining whether to power down units. For example, in various embodiments, display processing unit 110 may fetch individual image source lines frequently (e.g., an individual line may be fetched every 10 ms) or blocks of multiple image source lines less frequently (e.g., a block may be fetched every 100 ms) depending on the operations being performed by display processing unit 110. (For example, as will be discussed with respect to FIGS. 2 and 3, in one embodiment, individual image source lines or blocks of lines may be fetched based on whether display processing unit 110 is scaling the image data.) In various embodiments, when display processing unit 110 fetches blocks of multiple image source lines, fabric 102 and memory controller 104 may be idle for some time before another block of data is fetched. As a result, in such an embodiment, fabric 102 and memory controller 104 may be powered down.

In certain embodiments, the determination to power down fabric 102 and/or memory controller 104 may be based on a timer that tracks how long a certain unit has been idle. In one embodiment, once the timer indicates that a unit (e.g., fabric 102 or memory controller 104) has been idle for an allotted amount of time, control logic may cause the unit to be powered down. As such, when display processing unit 110 fetches data in bursts, leaving the fabric 102 and memory controller 104 idle in between fetches, units 102 and 104 may be powered down responsive to the timer satisfying a particular threshold. For example, control logic may power down fabric 102 after the timer indicates an idle period of 100 ms or greater. In one embodiment, once power has been reduced to fabric 102 and/or memory controller 104, power may be restored responsive to a subsequent request for data (e.g., read or write request) from any unit (e.g., display processing unit 110 or processor unit 108).

Figure 2:
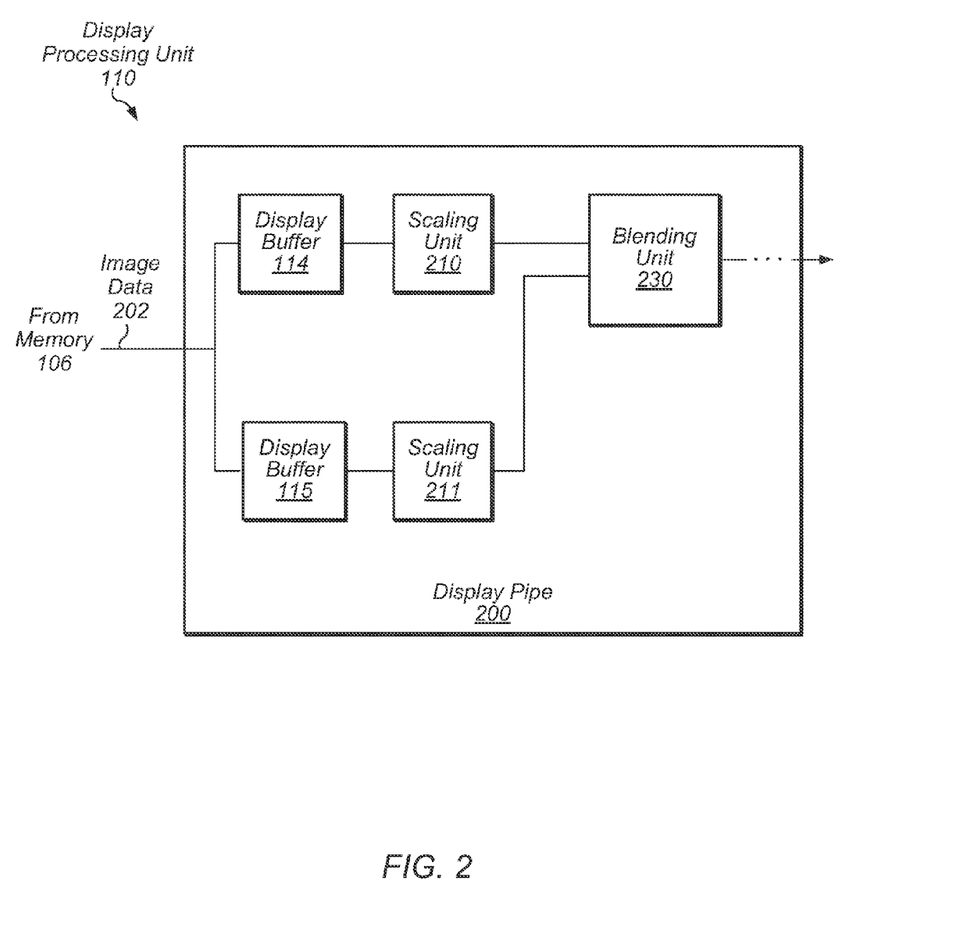
FIG. 2 is a block diagram illustrating one embodiment of a display pipe within the computer system.

Turning now to FIG. 2, a block diagram of display processing unit 110 is shown. As discussed above, in various embodiments, display processing unit 110 may be configured to fetch and process image data such that system 100 can render the data on a display unit. In the illustrated embodiment, display processing unit 110 includes a display pipe 200 to facilitate image rendering. Display pipe 200 in turn includes display buffers 114 and 115, scaling units 210 and 211, and blending unit 230. In some embodiments, display buffer 114 and scaling unit 210 is identical to display buffer 115 and scaling unit 211, respectively. (As such, any description applicable to units 114 and 210 is similarly applicable to units 115 and 211.) Although not shown, display pipe 200 may include multiple additional pipeline stages in various embodiments.

As noted above, in one embodiment, display buffer 114 is configured to store image data 202 fetched from memory 106. In certain embodiments, image data 202 may be fetched alternatively from storage device 112. As will be described with respect to FIG. 3, in various embodiments, image data 202 is stored as image source lines within line buffers of display buffer 114. As used herein, the term "line buffer" refers to circuitry configured to store an individual image source line (or portion of a source line). As also discussed, display buffer 114 may fetch one image source line at a time or blocks of multiple image source lines depending on the mode in which display processing unit 110 is operating (e.g., scale or non-scale mode).

In the illustrated embodiment, scaling unit 210 is configured to scale image data 202 received from buffer 114. In general, scaling may refer to changing the pixel resolution of an image. Scaling performed by scaling unit 210 may include downscaling, upscaling, vertical scaling and/or horizontal scaling. For example, an image having a resolution of 200 pixels wide by 100 pixels high may be downscaled horizontally and vertically to have a resolution of 100 pixels wide by 75 pixels high. In one embodiment, scaling unit 210 may reduce the resolution of such an image by generating output pixel components (e.g., R, G, B components) for the scaled image based on the components of nearby pixels in the original image. As but one example, scaling may be performed when an application generates image data that does not coincide with the native resolution of the display unit (e.g. a web browser originally formatted to display web content on a computer screen, viewed instead on a phone).

In some cases, not all image source lines are scaled, however (e.g., when an application is formatted in the native resolution). Accordingly, in various embodiments, display pipe 200 may be configured such that it operates in a "scale mode" or a "non-scale mode." In one embodiment, when display pipe 200 is operating in a scale mode, image source lines are scaled by scaling unit 210 prior to being transmitted to blending unit 230. While in scale mode, display buffer 114 may also fetch individual image source lines one at a time from memory. In a non-scale mode, the image source lines are not scaled prior to being transmitted to blending unit 230. In certain embodiments, when operating in a non-scale mode, display buffer 114 may fetch image source lines in a block. (i.e., two or more image source lines at a time).

In the illustrated embodiment, image source lines (scaled and not scaled) may be transmitted to blending unit 230 (or, in other embodiments, to a different stage in the pipeline). The additional image data may include information (e.g., related to transparency or positioning) regarding another image to be displayed along with image data 202. The image source lines and additional image data may be combined in a variety of ways by blending unit 230 to render a final image (e.g., icons combined with a desktop background).

Figure 3:
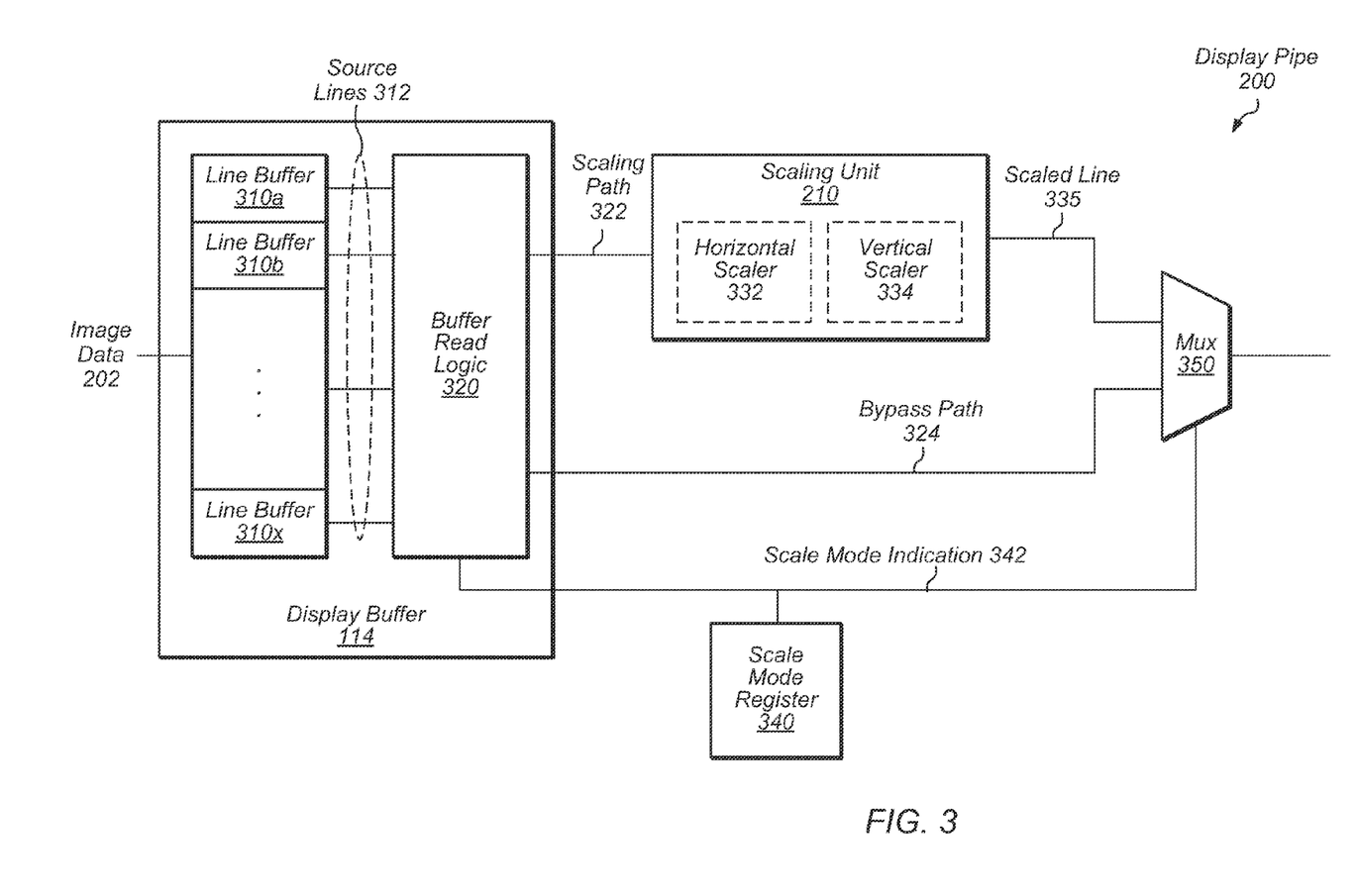
FIG. 3 is a block diagram illustrating one embodiment of components within a display pipe.

Turning now to FIG. 3, a block diagram of display buffer 114 and scaling unit 210 is shown in further detail. As shown, display pipe 200 includes circuitry related to scaling (i.e., scaling unit 210), display buffer 114, scale mode register 340 and mux 350. In the illustrated embodiment, display buffer 114 also includes a plurality of line buffers 310a-x (nine (9) buffers 310, in one embodiment), each configured to store a respective image source line, and buffer read logic 320. As will be discussed, in various embodiments, circuits 310-350 may be used to implement support for scale and non-scale modes.

In the illustrated embodiment, the mode in which display pipe 200 operates may be controlled by the value of scale mode register 340 as indicated by one or more bits. In various embodiments, an operating system may set the value in register 340 (i.e., control which mode display pipe 200 should operate in). In various embodiments, while in a non-scale mode, buffer read logic 320 may be configured such that it selectively reads one line buffer 310a-x at a time. As such, display buffer 114 may be configured to retain all the image source lines in line buffers 310a-x until each one has been read by buffer read logic 320. Subsequently, display buffer 114 may fetch another block of image source lines to be read by buffer read logic 320.

In scale mode, buffer read logic 320 may be configured to read all line buffers 310a-x simultaneously. After each reading, display buffer 114 may be configured to shift down each image source line to the adjacent line buffer (e.g. transfer image source line from line buffer 310a to 310b) and fetch a new image source line (e.g. fill line buffer 310a with new image source line). Accordingly, display buffer 114 may be configured to fetch a new image source line after each reading performed by buffer read logic 320.

In scale mode, the image source lines are transferred via scaling path 322 to scaling unit 210. As illustrated, scaling unit 210 includes horizontal scaler 332 and vertical scaler 334. Horizontal scaler 332 may be configured to process horizontal lines of pixels; similarly, vertical scaler 334 may be configured to process vertical lines of pixels. As illustrated, scaling unit 210 may be configured to generate output pixel components in a scaled image based on characteristics of nearby pixels in the original image. For example, in the case where scaling path 322 transmits nine image source lines (i.e., from line buffers 312a-x), these source lines represent 9 lines of pixels that are adjacent to each other. As such, horizontal scaler 332 and vertical scaler 334 may apply any combination of formulas to the nine image source lines to output scaled line 335.

In non-scale mode, the image source lines are transferred via bypass path 324 to mux 350. As such, the image source lines are not scaled. As illustrated, scale mode register 340 may indicate to mux 350, which mode display pipe 200 is configured to operate in. Mux 350 may select scaled line 335 or bypass path 324 accordingly and output the image data to blending unit 230 or another stage in the pipeline.

In certain embodiments in which display pipe 200 is operating on image data that is encoded using subsampled chroma, display pipe 200 may operate in a hybrid mode that incorporates functionality of scale mode and non-scale mode. In this hybrid mode, image data may be scaled in one dimension (e.g., horizontal dimension) but not the other. In one embodiment, when operating in such a mode, display pipe 200 may transmit image data via scaling path 322. As with non-scaling mode, individual source image lines may be read (i.e., one at a time) from line buffers 310, enabling blocks of multiple image source lines to be read from memory 106. Upon arrival at scaling unit, image source lines may be processed by the relevant scaler (e.g., horizontal scaler 332 or vertical scaler 334) and may bypass the non-relevant scaler. For example, in the case of the $YC_BC_R$ 4:2:2 color space, horizontal upscaling may be performed if the data is being converted to an RGB color space since two horizontally adjacent pixels share $C_B$ and $C_R$ chroma components. In such a situation, the horizontal scaler 332 may perform upscaling while vertical scaler 334 is bypassed. In various embodiments, bypassing one of scalers 332 or 334 may afford additional power saving as the bypassed scaler may be power gated and/or clock gated.

As discussed previously, in a non-scale mode, buffer read logic 320 may be configured to selectively read each line buffer 310a-x one at a time. In this mode, display buffer 114 may fetch blocks of image source line data in bursts (as opposed to continuously fetching an image source line). This leaves fabric 102 and memory controller 104 idle in between fetches. As such, fabric 102 and memory controller 104 may be powered down responsive to the idle time satisfying a particular threshold. This results in significant power savings. Additionally, by bypassing scaling unit 210 via bypass path 324 (e.g., in non-scale mode) or individual scalers 332 and 334 (e.g., in a hybrid mode), further power savings may be achieved (e.g., scaling unit 210 or individual scalers 332 and 334 may be powered-down when not in use). In certain embodiments, fabric 102 may also be powered down in scale mode in between fetch operations, however, fabric 102 may be powered down for shorter intervals than when operating in a non-scale mode.

Figure 4:
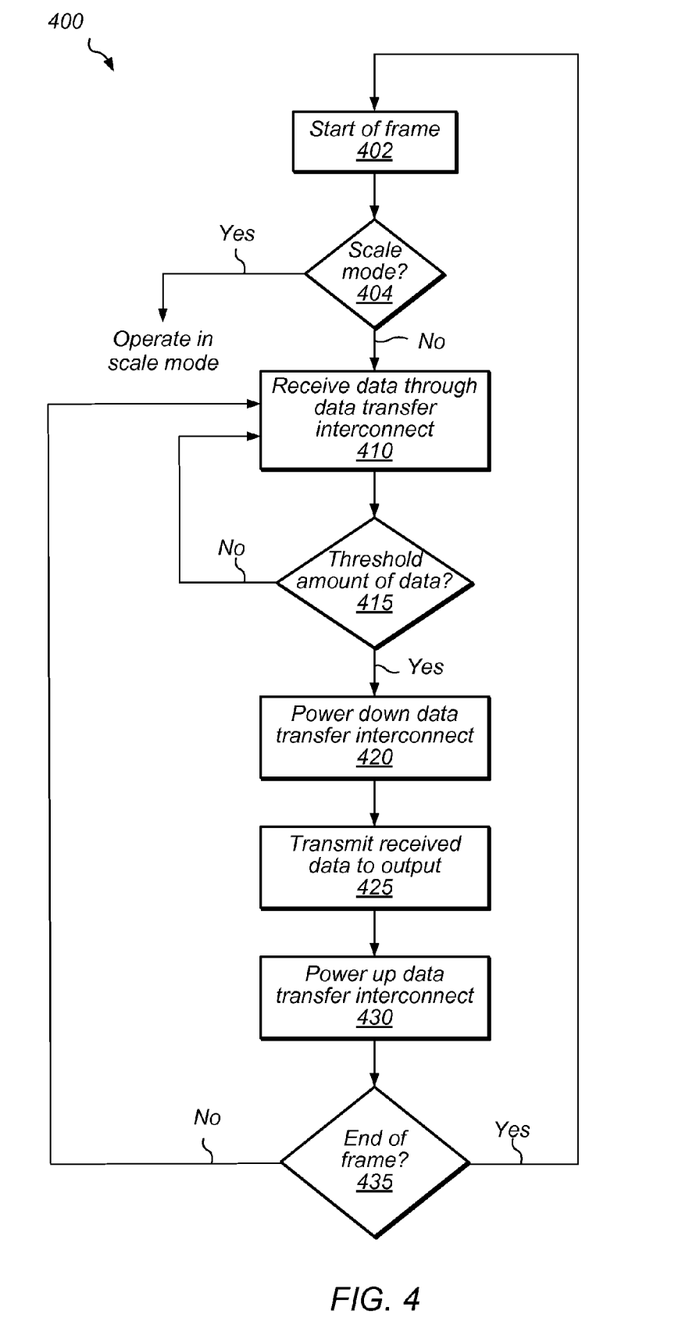
FIG. 4 is a flow diagram illustrating one embodiment of a method for receiving image data.

Turning now to FIG. 4, a flow diagram illustrating one embodiment of a method for implementing a non-scale mode within a system is shown. Method 400 may be performed by any suitable system that supports power managing one or more circuits such as system 100. In various embodiments, some of the blocks shown in FIG. 4 may be performed concurrently, in a different order than shown, or omitted. Additional method elements may also be performed as desired.

Method 400 begins at step 402, at the beginning of a frame a determination is made at decision block 404 regarding whether to operate in a scale mode. If yes, flow proceeds to operate in a scale mode. If no, flow proceeds to operate in non-scale mode beginning at step 410. At step 410, a unit (e.g., display pipe 200) receives data (e.g., image data 202) through a data transfer interconnect (e.g., fabric 102). In certain embodiments, step 410 may occur while display pipe 200 is operating in a non-scale or hybrid mode. The display pipe may receive an indication (e.g., from a bit set in scale mode register 340) accordingly and proceed to fetch image source lines in blocks. At decision block 415, a determination is made as to whether the amount of received image data is greater than a threshold amount of data (e.g., two or more source lines are fetched). As display pipe is configured to operate in a non-scale (or hybrid) mode, as discussed above, once the threshold amount of image data is received, the display pipe proceeds to selectively read each line buffer (e.g., 310a-x). If a threshold amount of data is not received, flow proceeds back to step 410 at which point, the display pipe may continue to fetch image data until a threshold amount is received.

As explained above, at decision block 415, if a threshold amount of data is received, the data transfer interconnect and other units (e.g., memory controller 104) may remain idle while the display pipe reads the image data. As discussed previously, in some embodiments, step 415 entails checking a timer to determine whether the data transfer interconnect has been idle for a threshold amount of time. In other embodiments, an indication that a threshold amount of data has been received may be sent by display pipe 200. Accordingly, once an indication or determination is made that the data transfer interconnect should be powered down, at step 420 the data transfer interconnect is powered down. Step 420 may also include powering down or reducing power to other circuitry such as memory controller 104. In other embodiments, a portion of the data transfer interconnect (as opposed to all of it) may be powered down.

At step 425 the display pipe transmits the received data to an output. In certain embodiments, this may be a blending unit (e.g., blending unit 230) or to any other stage in the pipeline. At this point, the display pipe may fetch more data. As such, in response to transmitting the image data, at step 430, the data transfer interconnect is powered up so more data may be fetched. At step 435 a determination is made regarding whether the end of the frame has been reached. If yes, flow proceeds back to step 402. If no, flow proceeds back to step 410 in which more data is received through data transfer interconnect 410. As discussed previously, in certain embodiments, operating in a scale mode prevents the fabric from being powered down between fetches due to the display pipe successively fetching one image source line at a time. In other embodiments, however, the fabric may still be powered down in a scale mode but for a significantly smaller amount of time than what occurs in a non-scale mode.

Figure 5:
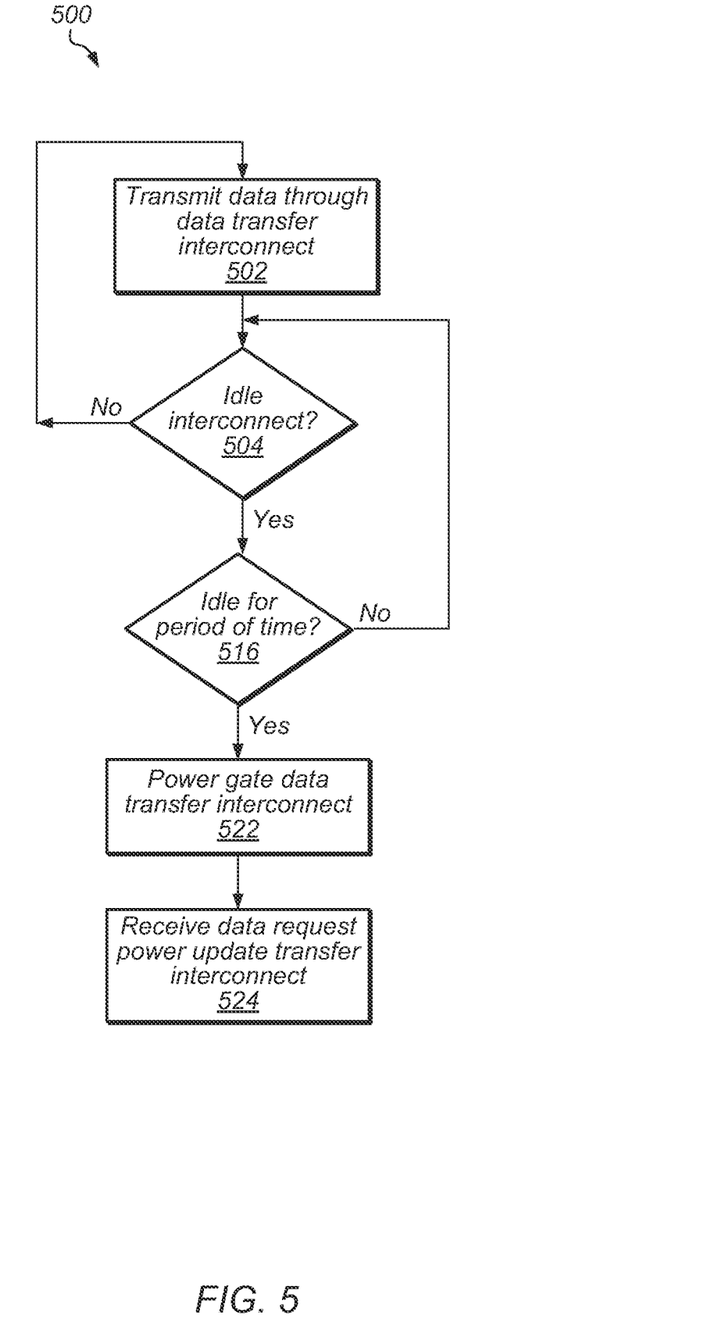
FIG. 5 is a flow diagram illustrating one embodiment of a method for powering down a data transfer interconnect.

Turning now to FIG. 5, a flow diagram illustrating one embodiment of a method for powering down a data transfer interconnect is shown. Similar to method 400, method 500 may be performed by any suitable system that supports power management. In various embodiments, method 500 may be used by any system that performs method 400 to fetch image data. In various embodiments, some of the blocks shown in FIG. 5 may be performed concurrently, in a different order than shown, or omitted. Additional method elements may also be performed as desired.

Method 500 begins at step 502 in which image data (e.g., image data 202) is transmitted through a data transfer interconnect (e.g., fabric 102). As discussed previously, in various embodiments, image data may be transferred from memory (e.g., memory 106) to a display pipe (e.g., display pipe 200). At decision block 504, a determination is made as to whether the interconnect is idle. As mentioned above, in certain embodiments, this determination may be made by a timer. If the interconnect is not idle, flow proceeds back to step 502. If the interconnect is idle, flow proceeds to step 516 at which point a determination is made as to whether the interconnect has been idle for a threshold amount of time. If the idle time is below the threshold amount of time, flow proceeds through back to decision block 504. Otherwise, flow proceeds through to step 522. At step 522, the data transfer interconnect is power gated. At step 524, the data transfer interconnect is powered back up upon receiving a data request (e.g., display pipe 200 requests to fetch another block of data from memory 106).

Figure 6:
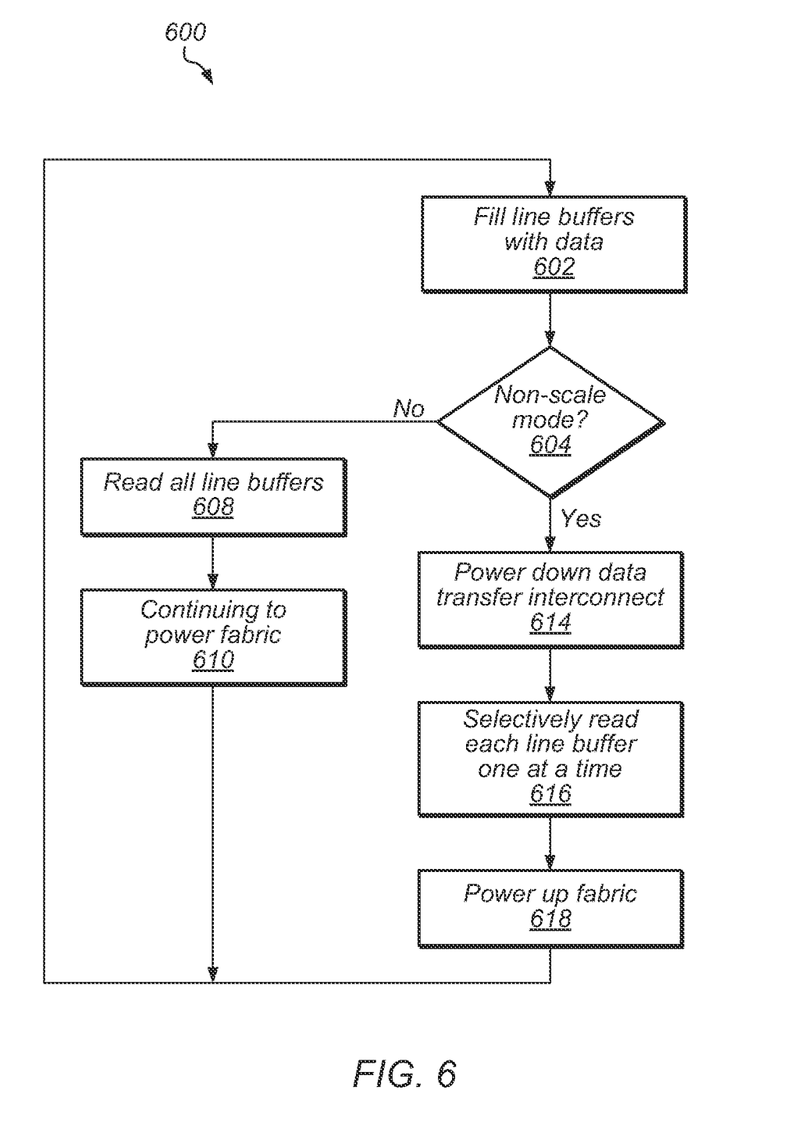
FIG. 6 is a flow diagram illustrating one embodiment of a method for operating the display pipe in different modes.

Turning now to FIG. 6, a flow diagram illustrating one embodiment of a method for operating a display pipe in two different modes is shown. In various embodiments, method 600 is performed within a display processing unit (e.g., display processing unit 110). In various embodiments, some of the blocks shown in FIG. 6 may be performed concurrently, in a different order than shown, or omitted. Additional method elements may also be performed as desired.

Method 600 begins at step 602 in which line buffers (e.g., line buffers 310a-x) within a display buffer (e.g., display buffer 114) are filled with data (e.g., image data 202). At decision block 604, a determination is made as to whether the display pipe is operating in a non-scale mode (e.g., in one embodiment this may be indicated by a register such as scale mode register 340). If a scale mode is indicated, flow proceeds to step 608. At step 608, read logic (e.g., buffer read logic 320), reads all line buffers. As discussed above, subsequent to reading all the line buffers, the display pipe successively fetches a new image source line. Accordingly, at step 610, as the fabric does not remain idle, the system continues to power the fabric. Flow proceeds through back to step 602.

At decision block 604, if a non-scale mode is indicated flow proceeds to step 614. At step 614 the data transfer interconnect is powered down (i.e., in certain embodiments a timer controls this; in other embodiments the display pipe may control this). At step 616, read logic selectively reads each line buffer one at a time. After reading all the buffers, at step 618, the fabric is powered up. Flow proceeds back to step 602.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    operating a display unit in a first mode of operation, including:
        a display buffer receiving sets of image data, each set having a first size, through a data transfer interconnect;
        scaling circuitry scaling image data from the display buffer in at least two dimensions; and
    operating the display unit in a second mode of operation, including:
        the display buffer receiving sets of image data, each set having a second size that is greater than the first size, through the data transfer interconnect;
        the scaling circuitry scaling image data from the display buffer in at most one dimension; and
        powering down the data transfer interconnect during one or more time intervals between the display buffer receiving the sets of image data.

2. The method of claim 1, wherein the display buffer includes a plurality of line buffers, each configured to store a respective image source line, wherein a display pipe configured to render images to be displayed includes the display buffer; and
    wherein said powering down is performed in response to the received image data including two or more image source lines.

3. The method of claim 2, wherein the operating in the second mode of operation includes:
    selectively reading one or more of the image source lines from the plurality of line buffers, wherein the selectively reading is performed multiple times during the time interval.

4. The method of claim 1, wherein the second mode is a non-scale mode, wherein the operating in the second mode of operation includes the scaling circuitry transmitting the image data from the display buffer via a bypass path without scaling the image data from the display buffer.

5. The method of claim 1, further comprising:
    determining whether to use the first mode or the second mode based on a programmable setting stored in a register of a display pipe.

6. The method of claim 1, further comprising:
    wherein the powering down the data transfer interconnect is based on a timer that maintains a value indicative of an amount of time that the data transfer interconnect has been idle.

7. An apparatus, comprising:
a data transfer interconnect;
a display buffer; and
a display pipe configured to:
  operate in a first mode in which the display pipe is configured to:
    receive sets of image data, each set having a first size, via the data transfer interconnect and store the sets of image data in the display buffer; and
    scale image data from the display buffer in at least two dimensions; and
  operate in a second mode in which the display pipe is configured to:
    receive sets of image data, each set having a second size that is greater than the first size, via the data transfer interconnect and store the sets of image data in the display buffer; and
    scale image data from the display buffer in at most one dimension,
    wherein the apparatus is configured, in the second mode, to reduce power to the data transfer interconnect during one or more time intervals between receiving sets of image data.

8. The apparatus of claim 7, wherein the apparatus is configured to reduce power to the data transfer interconnect in response to an interval between fetching the sets of image data, each set having the second size, wherein the length of the interval exceeds a threshold value.

9. The apparatus of claim 8, wherein the apparatus is configured to maintain a timer indicative of an amount of time that the data transfer interconnect has remained idle, and wherein the apparatus is configured to reduce power to the data transfer interconnect based on the timer.

10. The apparatus of claim 7, wherein the apparatus is configured, in the second mode, to reduce power to a memory controller between fetching sets of image data, wherein the memory controller is configured to retrieve data from the memory.

11. The apparatus of claim 7, wherein the display buffer includes a plurality of line buffers configured to store lines of image data, wherein the first size corresponds to a single line of image data and wherein the second size corresponds to multiple lines of image data.

12. The apparatus of claim 7, wherein the second mode is a non-scale mode, wherein the display pipe is configured to, in the second mode, scale image data from the display buffer in at most one dimension by causing the sets of image data stored in the display buffer to bypass scaling circuitry without scaling the sets of image data.

13. The apparatus of claim 11, wherein the display pipe is configured to perform both horizontal and vertical scaling of the image data in the display buffer in the first mode.

14. The apparatus of claim 11, wherein the display pipe is configured to fetch image source lines having subsampled chroma, and wherein the display pipe is configured, in the second mode, to cause the image source lines having subsampled chroma to bypass a vertical scaler or a horizontal scaler.

15. An apparatus, comprising:
a plurality of line buffers configured to receive image data from a memory via a data transfer interconnect;
scaling circuitry configured to scale image data from the line buffers in a plurality of dimensions; and
display circuitry configured to:
  operate in a scaling mode to use the scaling circuitry to produce an output line of image data by performing one or more scaling operations in at least two dimensions on at least a portion of the image data, wherein the at least a portion of the image data is read from a first set of line buffers that includes two or more of the plurality of line buffers; and
  operate in a non-scaling mode or a hybrid mode in which the apparatus is configured to produce an output line of image data by selectively reading a portion of the image data from a second set of line buffers that includes a smaller number of line buffers than the first set of line buffers and bypass the image data from the second set of line buffers or perform one or more scaling operations in at most one dimension on the image data from the second set of line buffers; and
  reduce power to the data transfer interconnect, in the non-scaling mode or the hybrid mode, during one or more time intervals between fetching image data for the line buffers.

16. The apparatus of claim 15, wherein the apparatus is configured to
  maintain power to the data transfer interconnect while operating in the scaling mode.

17. The apparatus of claim 15, wherein the display circuitry is configured to:
  in the non-scaling mode or the hybrid mode, perform a first set of read operations from the memory, wherein each read operation in the first set are of a plurality of image source lines; and
  in response to operating in the scaling mode, perform a second set of read operations from the memory, wherein one read operation in the second set are of a single image source line;
  wherein the display circuitry is configured to perform the second set at a higher rate than the first set.

18. The apparatus of claim 15, further comprising:
a register configured to store a value indicative of whether the apparatus is to operate the scaling mode, the non-scaling mode, or the hybrid mode.

19. The apparatus of claim 15, wherein the apparatus is configured to:
  identify a set of image data as having subsampled chroma; and
  cause the set of image data to bypass one of a horizontal scaler and a vertical scaler of the scaling circuitry in response to the identification.

20. The apparatus of claim 15, wherein the apparatus is configured to:
  reduce power to a memory controller of the memory while operating in the non-scaling mode; and
  maintain power to the memory controller while operating in the scaling mode.

* * * * *